United States Patent
Hanabusa et al.

(10) Patent No.: US 7,224,483 B2
(45) Date of Patent: May 29, 2007

(54) IMAGE SIGNAL CORRECTION LIGHT SOURCE THAT CAN COPE WITH DUST AND SCRATCH ON TRANSPARENT DOCUMENT, AND ITS CONTROL

(75) Inventors: Mitsugu Hanabusa, Ibaraki (JP); Tsutomu Takayama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1024 days.

(21) Appl. No.: 10/350,743

(22) Filed: Jan. 24, 2003

(65) Prior Publication Data

US 2003/0142371 A1 Jul. 31, 2003

(30) Foreign Application Priority Data

Jan. 25, 2002 (JP) .............................. 2002/017221
Feb. 7, 2002 (JP) .............................. 2002/030917

(51) Int. Cl.
H04N 1/03 (2006.01)
H04N 1/04 (2006.01)
H04N 1/191 (2006.01)

(52) U.S. Cl. ....................... 358/1.6; 358/474; 358/475; 358/487; 358/494

(58) Field of Classification Search ........ 358/505–506, 358/509–510, 513–514, 471, 474, 475, 480, 358/482, 487, 494, 1.6
See application file for complete search history.

(56) References Cited

U.S. PATENT DOCUMENTS 4,930,008 A * 5/1990 Suzuki et al. ................ 358/505
6,229,628 B1 5/2001 Takeuch ....................... 358/475
6,501,087 B1 * 12/2002 Koretsune et al. ........ 250/208.1
2001/0030278 A1 10/2001 Koshimi ................... 250/208.1
2006/0114521 A1 * 6/2006 Bailey et al. ................ 358/474
2006/0268367 A1 * 11/2006 Hayashide ................... 358/474

FOREIGN PATENT DOCUMENTS

JP 10-004481 1/1998
JP 2001-045234 2/2001
JP 2001-298593 10/2001

* cited by examiner

*Primary Examiner*—Scott A. Rogers
(74) *Attorney, Agent, or Firm*—Fitzpatrick, Cella, Harper & Scinto

(57) ABSTRACT

In a method of controlling an image reading apparatus, which has an illumination unit adapted to irradiate an object with first and second light rays in different frequency ranges, and a light-receiving unit adapted to receive light coming from the object, and to output a signal, and reads an image of the object by moving the illumination unit and light-receiving unit relative to the object, the light-receiving unit outputs a first signal in response to irradiation with the first light ray, and outputs a second signal in response to irradiation with the second light ray. Upon reading image information for one line by the image reading apparatus, the second light ray is controlled to be sequentially turned on at a plurality of timings to sandwich the ON timing of the first light ray, and image signals for one line corresponding to the first and second light rays are obtained by averaging or adding respective pieces of image information obtained at the plurality of timings for each of the first and second signals.

10 Claims, 18 Drawing Sheets

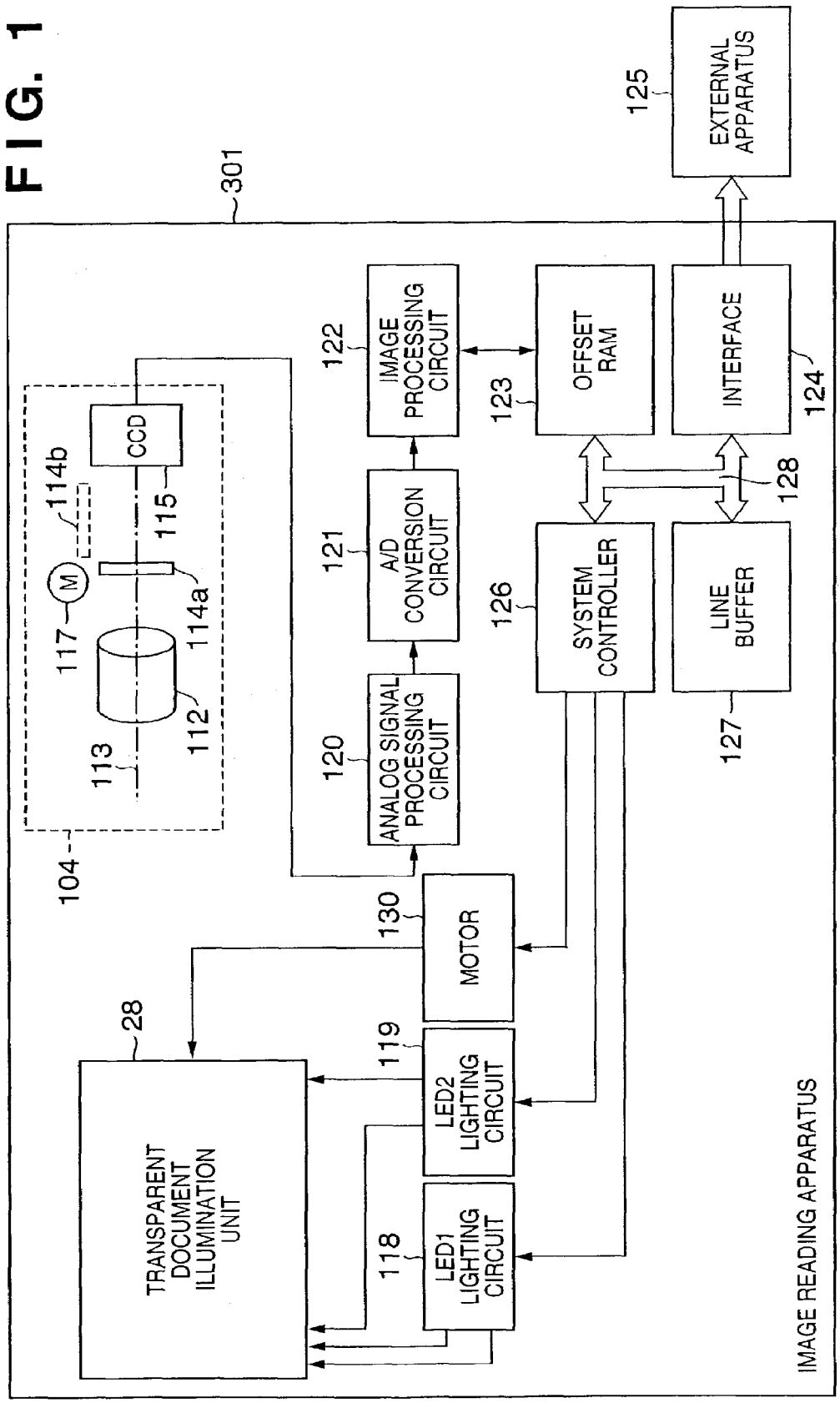

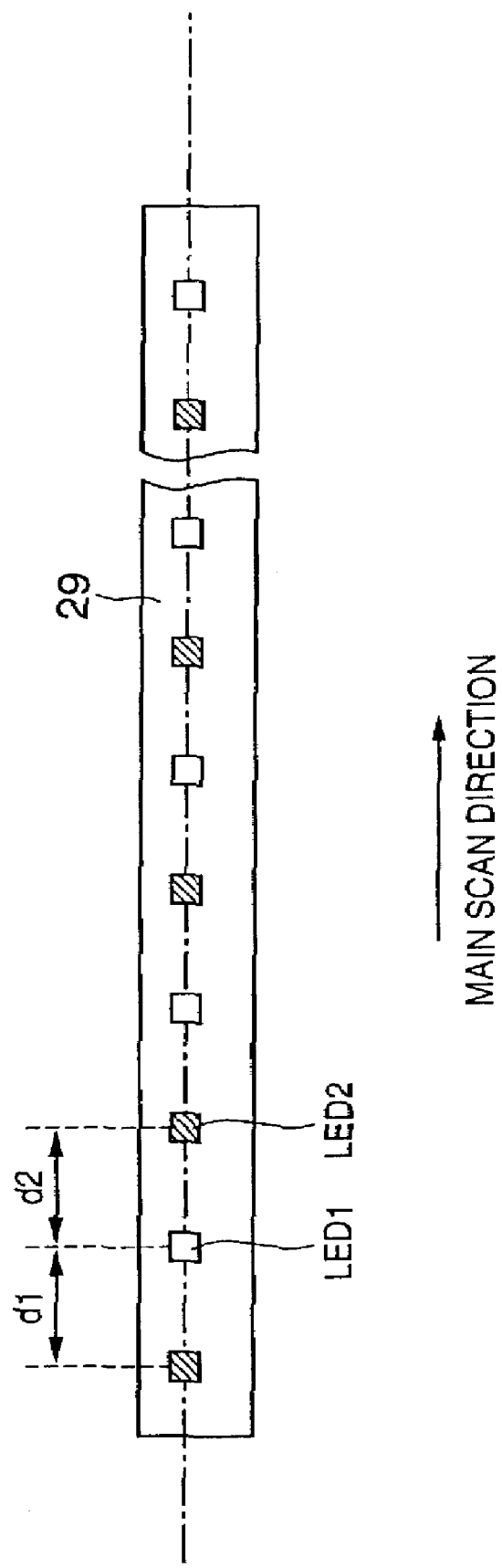

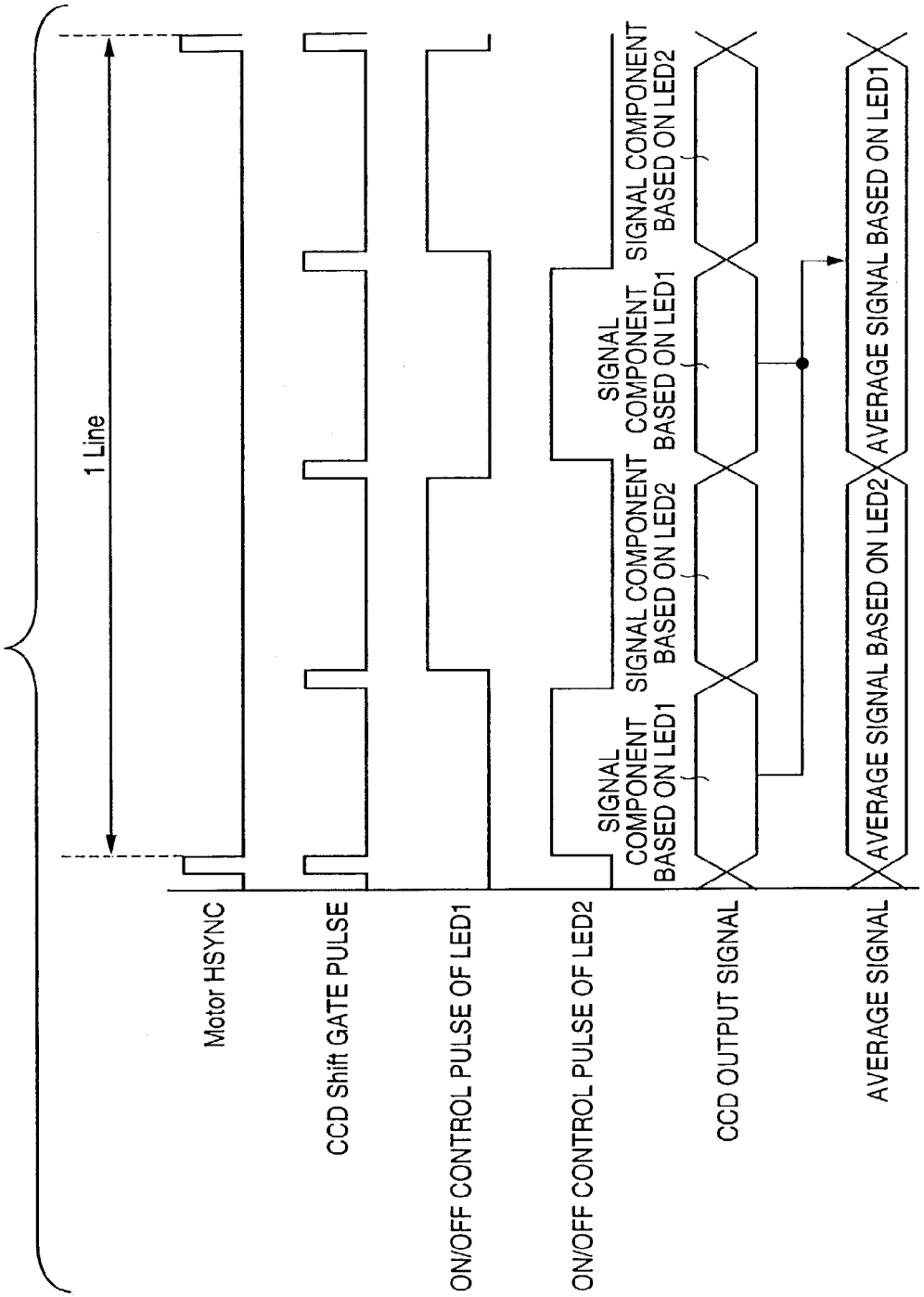

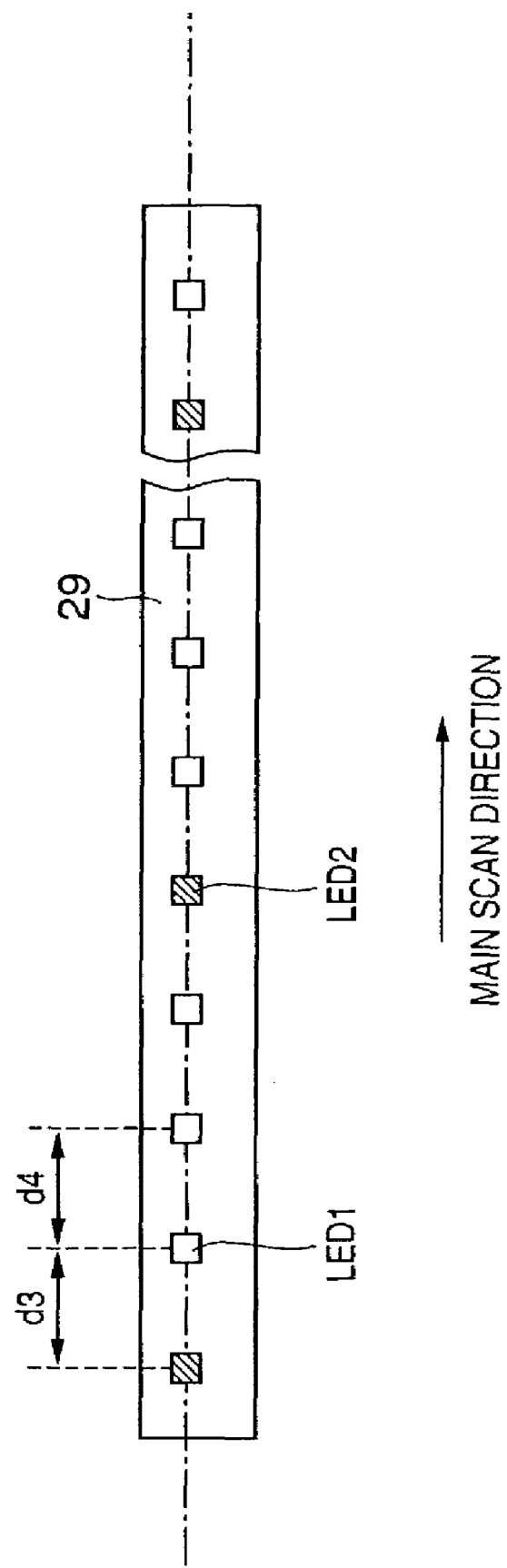

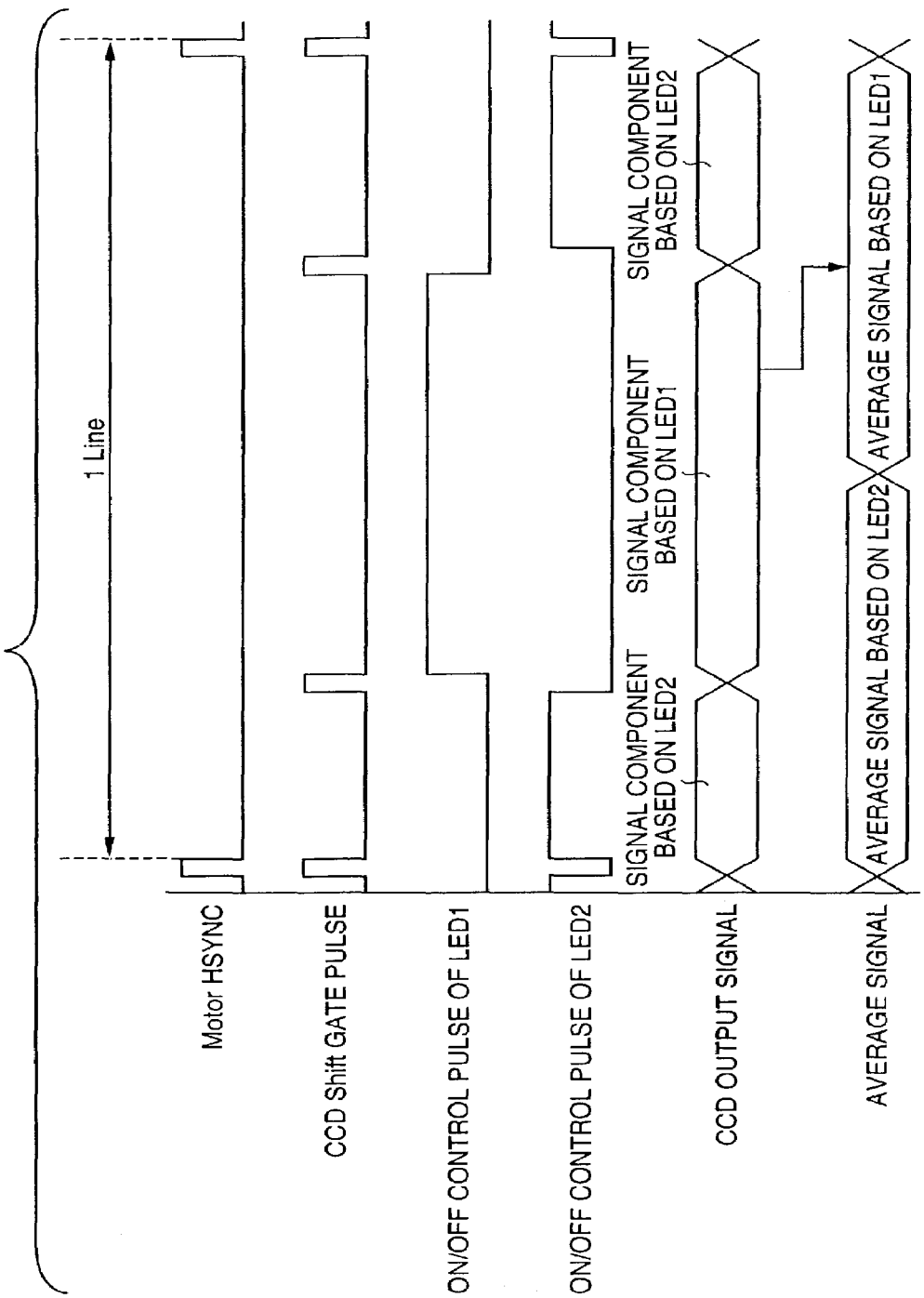

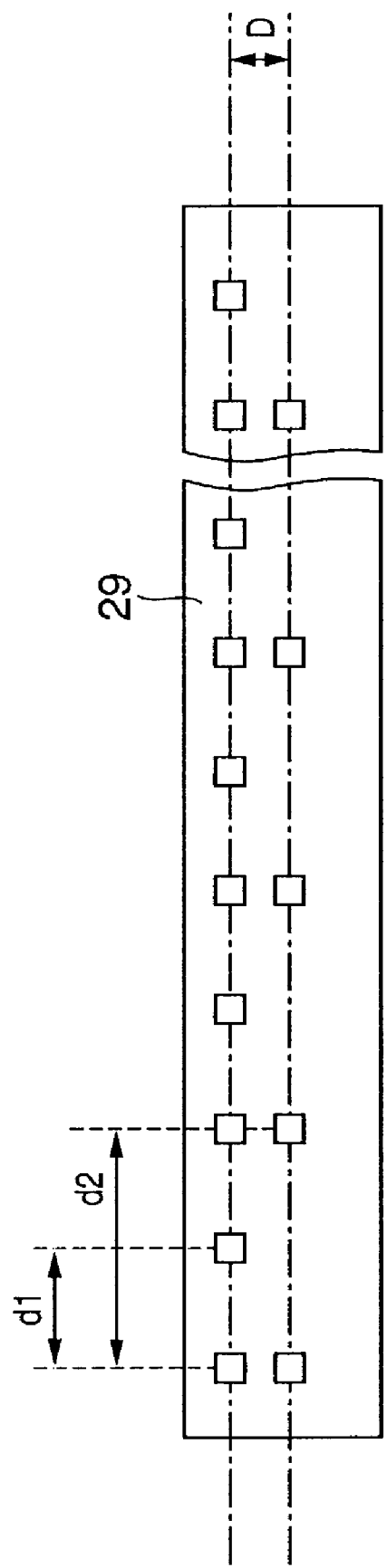

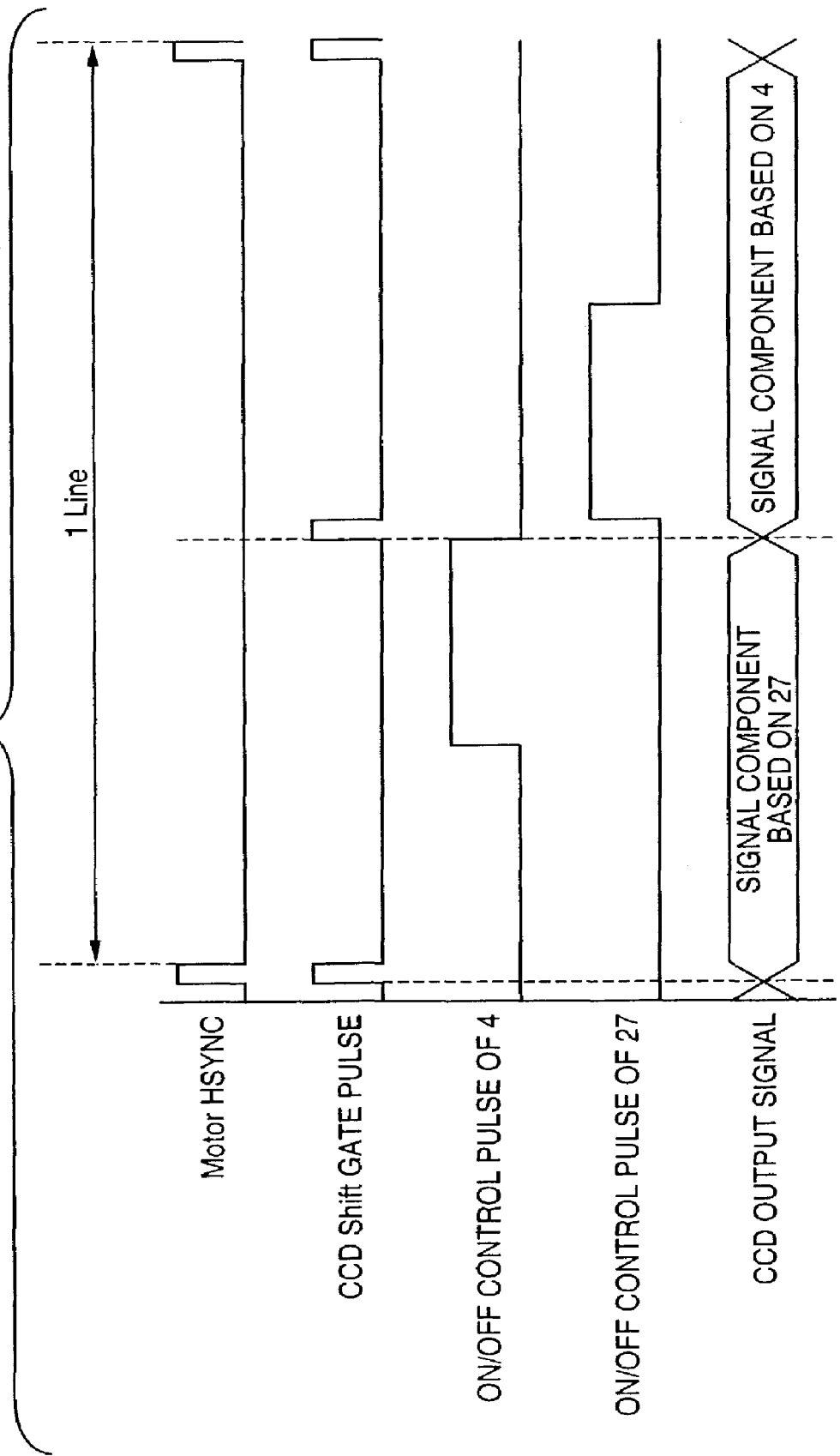

IMAGE SIGNAL CORRECTION LIGHT SOURCE THAT CAN COPE WITH DUST AND SCRATCH ON TRANSPARENT DOCUMENT, AND ITS CONTROL

FIELD OF THE INVENTION

The present invention relates to a technique for reading information on a transparent document such as a photo film or the like, and correcting defects caused by, e.g., dust and scratches in an image by processing the read image signal.

BACKGROUND OF THE INVENTION

In recent years, along with the development of communication networks, high-speed computers, and large-size storage media, higher image quality is demanded upon handling color image information. Above all, a demand for accurately reading color image information at high speed and with high image quality using a scanner or the like is increasing.

Also, upon reading an image on a photo film, a demand for accurately reading photo film image information of a sleeve form having a plurality of frames at high speed and with high image quality is increasing. In order to read a film image with higher image quality, an image reading apparatus having dust/scratch removal processing unit on a film has been proposed, and Japanese Patent Laid-Open No. 2001-298593 is known as such example. According to this proposal, a light source, which has an infrared LED used to detect dust/scratch information, and a light source used to read image information, forms a surface light source, and can read an image free from the influences of dust and scratches. However, since the surface light source as an indirect illumination system has poor illumination efficiency, a method of synchronously moving an illumination system and optical system is known so as to read an image at higher speed and with higher image quality.

As the method of controlling the illumination system and optical system, Japanese Patent Laid-Open No. 10-004481 or the like is known. This proposal provides means that reduces the influences of, e.g., synchronous errors caused by positional deviation between the illumination system and optical system as much as possible. Also, as an arrangement which has a plurality of light sources, and reduces positional deviation of pixel information corresponding to the plurality of light sources by controlling the phases of ON/OFF controllers of the light sources upon reading image information while changing the light sources to be turned on by line, that is disclosed in Japanese Patent Laid-Open No. 2001-045234 is known.

An example which is designed to improve dust/scratch component removal performance from an image signal obtained by reading a transparent document will be briefly described below using FIGS. 15, 16, 17A, and 17B.

FIG. 15 is a schematic sectional view showing an example of an image reading apparatus which can read both a reflective document such as a paper document or the like, and a transparent document such as a photo film or the like, and FIG. 16 is a partially cutaway front view showing an example of a transparent document illumination device used in the image reading apparatus having a dust/scratch removal function.

An image reading apparatus 100 includes a transparent document illumination device 200 required to read a transparent document such as a photo film or the like, and the device 200 is electrically connected to an image reading apparatus control board 3 via a transparent document light source ON/OFF inverter 7 and I/F cable 15 so as to be controlled by the control board 3. The transparent document illumination device 200 has a transparent document illumination unit 18 used to read a transparent document. An optical unit 14 has a first reflection mirror 9, second reflection mirror 10, third reflection mirror 11, and lens 12, which are required to optically form a transparent document image on a CCD image sensor 13, and also a reflective document illumination light source 8 used to illuminate a reflective document such as a paper document or the like with light. The optical unit 14 reads an image while scanning in the direction of an arrow in FIG. 15 (sub-scan direction) by the image input apparatus control board 3 and a motor 16. Note that an image falling within a range specified by the optical unit 14 indicated by the dotted line, and the position of the transparent document illumination unit 18 can be read.

The CCD image sensor 13 and image input apparatus control board 3 are electrically connected via a signal cable 17. By synchronously scanning the transparent document illumination unit 18 and optical unit 14 by the motor 16, an electrical signal photoelectrically converted by the CCD image sensor 13 can be acquired as image data. A transparent plate 19 is interposed between the transparent document illumination unit 18 and a film guide 5 on a platen glass 6, and is arranged in the transparent document illumination device 200. The transparent plate 19 uses transparent glass or a diffusion material. In the transparent document illumination unit 18, a light source 4 used to read a transparent document, and an infrared LED array 27 used to acquire dust/scratch information are nearly parallelly juxtaposed, as shown in FIG. 16.

FIG. 17B shows the optical positional relationship upon synchronously scanning the transparent document illumination unit 18 and optical unit 14, and FIG. 17A is a graph showing the amounts of light of the light source 4 and infrared LED array 27. In FIG. 17A, the ordinate plots the amount of light, and the abscissa plots the position in the sub-scan direction in FIG. 17B. In order to read a film placed in the film guide 5, which is set at a predetermined position in advance, a diffusion sheet 30 is provided to make a light amount distribution L1$a$ formed by light source 4 and a light amount distribution L2$a$ formed by the infrared LED array 27 more homogeneous within a predetermined range (the read position of the optical unit 14) in the sub-scan direction.

Upon reading a transparent document image, the light source 4 and infrared LED array 27 are line-sequentially switched and scanned, while maintaining the positional relationship shown in FIG. 17B all the time, thus reading a high-quality image by utilizing the dust/scratch removal function in one scan.

However, it is often difficult to accurately detect position information of dust, scratches, and the like on a film.

For example, FIG. 18 simply shows a method of reducing image positional deviation.

In FIG. 18, Motor HSYNC indicates a period signal for 1 Line to be scanned by the motor 16. In 1 Line, the accumulation time (CCD Shift gate pulse period) of the CCD image sensor 13 is divided into two periods, as shown in, e.g., FIG. 18, and a signal component as image information obtained by an ON/OFF control pulse of the light source 4, and a signal component as image information obtained by a relative ON time based on an ON/OFF control pulse of the infrared LED array 27 are line-sequentially obtained as CCD output signals in these periods. However, positional deviation of image information cannot be perfectly removed by only control based on the relative ON time with respect to the light amount distributions of the respective light sources in FIG. 17A. Also, the ON times of the respective light sources may become considerably shorter than the CCD accumulation time, resulting in poor S/N.

In the method using the conventional means proposed by Japanese Patent Laid-Open No. 2001-045234, the infrared LED array 27 is required to emit a large amount of light to obtain a homogeneous light amount distribution within the range on a document corresponding to RGB, 3-line range. Hence, the cost increases due to an increase in the number of chips of the LED array.

SUMMARY OF THE INVENTION

The present invention has been made in consideration of the above situation, and has as its first object to suppress positional deviation of image information and to improve the S/N.

It is a second object of the present invention to reduce the cost of an infrared light source without causing a quality drop of a CCD output signal.

According to the present invention, the foregoing first object is attained by providing a method of controlling an image reading apparatus, which comprises an illumination unit adapted to irradiate an object with first and second light rays in different frequency ranges, and a light-receiving unit adapted to receive light coming from the object, and to output a signal, and reads an image of the object by moving the illumination unit and light-receiving unit relative to the object, comprising: outputting from the light-receiving unit a first signal in response to irradiation with the first light ray, and a second signal in response to irradiation with the second light ray; and controlling to sequentially turn on the second light ray at a plurality of timings to sandwich an ON timing of the first light ray, and to obtain image signals for one line corresponding to the first and second light rays by averaging or adding respective pieces of image information obtained at the plurality of timings for each of the first and second signals, upon reading image information for one line by the image reading apparatus.

Further, according to the present invention, the first object of the present invention is also attained by providing an image reading apparatus comprising: an illumination unit adapted to irradiate an object with first and second light rays in different frequency ranges; a light-receiving unit adapted to receive light coming from the object, and to output a signal; a read controller adapted to read an image of the object by moving the illumination unit and the light-receiving unit relative to the object; a drive signal supply unit adapted to supply drive signals to the light-receiving unit to sequentially turn on the second light ray at a plurality of timings to sandwich an ON timing of the first light ray, and to output a first signal in response to irradiation with the first light ray, and a second signal in response to irradiation with the second light ray, upon reading image information for one line by the light-receiving unit; and a signal controller adapted to control to average or add a plurality of pieces of image information in one line obtained at the plurality of ON timings for each of the first and second signals.

Furthermore, the first object of the present invention is also attained by providing an illumination apparatus comprising a first light source unit adapted to emit light in a first frequency range, and a second light unit adapted to emit light in a second frequency range, which are arranged on substantially one line.

Further, the second object of the present invention is attained by providing an image sensing apparatus comprising: a fist light source unit having a line shape adapted to irradiate an object with light in a first frequency range; a second light source unit having a line shape adapted to irradiate the object with light in a second frequency range which is different from the first frequency range and has an invisible light range; a photoelectric conversion unit including a plurality of line sensors which receive light coming from the object irradiated with light emitted by the first and second light source units and output electrical signals; and a first optical unit, arranged on an optical axis of the second light source unit, adapted to converge light from the second light source unit, wherein an edge of the optical unit ends between the first and second light source units.

Further, the second object of the present invention is also attained by providing an image sensing apparatus comprising: a fist light source unit having a line shape adapted to irradiate an object with light in a first frequency range; a second light source unit having a line shape adapted to irradiate the object with light in a second frequency range which is different from the first frequency range and has an invisible light range; a photoelectric conversion unit including a plurality of line sensors which receive light coming from the object irradiated with light emitted by the first and second light source units and output electrical signals; and a first optical unit, arranged on an optical axis of the first light source unit, adapted to homogeneously distribute the light emitted by the first light source unit within a predetermined illumination range, wherein the first optical unit ends between the first and second light source units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing principal part of an image reading apparatus according to a first embodiment of the present invention;

FIG. 2 is a schematic view showing an LED array according to the first embodiment of the present invention;

FIG. 4 is an operation timing chart for explaining the first embodiment of the present invention;

FIG. 5 is a schematic view showing an LED array according to a second embodiment of the present invention;

FIG. 7 is an operation timing chart for explaining a fourth embodiment of the present invention;

FIG. 8 is a schematic view showing an LED array according to a fifth embodiment of the present invention;

FIG. 18 is an operation timing chart of the conventional apparatus.

DETAILED DESCRIPTION OF THE PREFERRED EMBODIMENTS

Figure 3A:
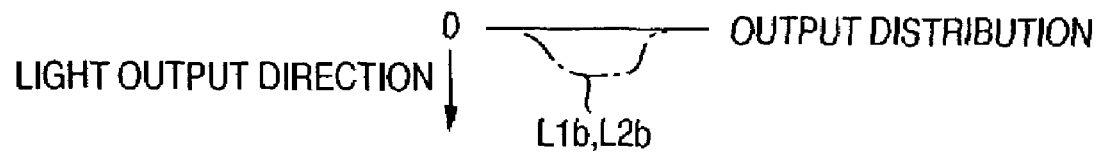
FIGS. 3A and 3B are schematic views of a transparent document illumination unit and optical system.

Preferred embodiments of the present invention will be described in detail in accordance with the accompanying drawings.

First Embodiment

<Block Diagram of Image Reading Apparatus According to First Embodiment>

FIG. 1 is a block diagram showing the system arrangement which comprises an image reading apparatus 301 according to the first embodiment. Referring to FIG. 1, reference numeral 104 denotes an optical system unit which is formed on the side of a scanner main body; 112, an imaging lens which forms an optical image of light that has been transmitted through a transparent document; 113, an optical axis that passes through the center of the imaging lens; and 114, a glass plate used to correct the optical path length difference caused by the wavelength difference between visible light and infrared light. Reference numeral 114a denotes a state wherein the glass plate is placed parallel to a plane nearly perpendicular to the optical axis 113; and 114b, a state wherein the glass plate 114a is rotated through about 90° to escape from the optical path of an optical image. These states are controlled by a glass plate control motor 117. Reference numeral 115 denotes a CCD linear image sensor which outputs an optical image formed by the imaging lens 112 as electrical signals (e.g., R, G, and B image signals). The image sensor 115 uses, e.g., a 3-line linear sensor comprising three, R, G, and B color filters.

Reference numeral 118 denotes a lighting circuit for LED1 (to be described later); 119, a lighting circuit for an infrared LED array 2 (to be referred to as infrared LED2 hereinafter). Reference numeral 130 denotes a motor for driving a transparent document illumination unit 28 (to be described later) having a plurality of light sources with respect to an object. Reference numeral 120 denotes an analog signal processing circuit for processing R, G, and B image signals output from the CCD linear image sensor 115; 121, an A (analog)/D (digital) conversion circuit; and 122, an image processing circuit which executes image processes required for the image reading apparatus. Since the image processes to be executed by the circuit 122 are not directly related to the present invention, a detailed description thereof will be omitted.

Reference numeral 123 denotes an offset RAM (random-access memory) used by the image processing circuit 122; 124, an interface; 125, an external apparatus such as a personal computer or the like; 126, a system controller; 127, a line buffer; and 128, a CPU (central processing unit) bus. The interface 124 temporarily stores image signals output from the image processing circuit 122 in the line buffer 127, and then outputs it to the personal computer 125. The system controller 126 is connected to the image processing circuit 122, line buffer 127, interface 124, and offset RAM 123 via the CPU bus 128 which includes address and data buses, as shown in FIG. 1. With this arrangement, data communications among circuits can be made.

<Acquire Signal for Dust/Scratch Removal>

FIG. 2 shows an LED array 29 on which LED1 elements which correspond to an LED light source used to read image information, and infrared LED2 elements which correspond to a light source used to detect dust/scratch information are alternately arranged on 1 Line in nearly the main scan direction.

The LED1 and LED2 elements are respectively arranged at pitches d1 and d2 and can independently undergo ON/OFF control. Note that the pitches d1 and d2 need not be fixed, and may be freely set based on design factors such as the light amount level, homogeneity in the main scan direction, and the like. Note that the LED1 elements can use a plurality of types of LEDs such as R (red), G (green), B (blue), white, and the like.

Figure 3B:
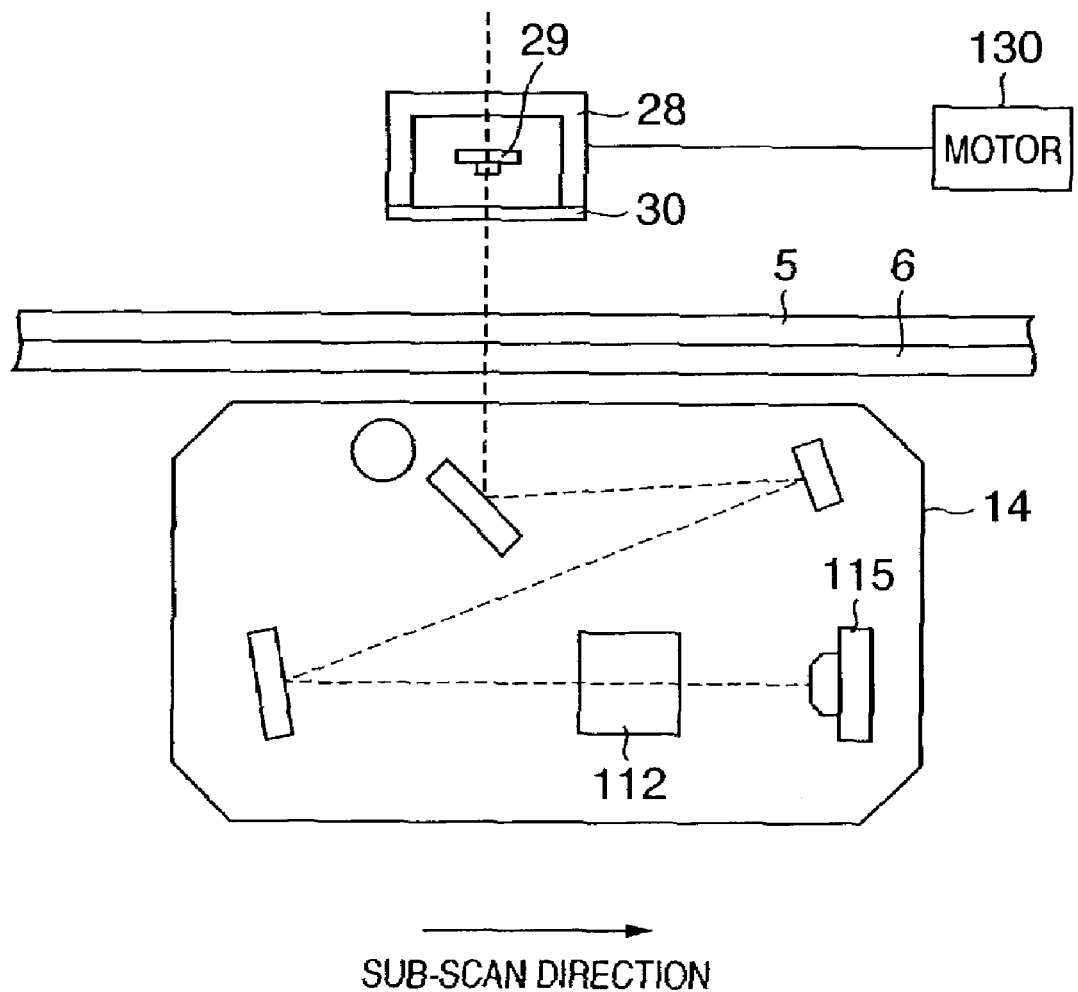

FIG. 3B shows the optical positional relationship for synchronously scanning the transparent document illumination unit 28 including the LED array 29 with the arrangement shown in FIG. 2, and the optical unit 104. As described above, in order to read a film placed in a film guide 5 which is set in advance at a predetermined position, the transparent document illumination unit 28 includes the LED1 and LED2 elements. As shown in FIG. 3A, a light amount distribution L1b of LED1, and a light amount distribution L2b of LED2 can be formed as nearly equal light amount distributions, since the LED1 and LED2 elements are arranged on 1 Line, as shown in FIG. 2, thus eliminating positional deviation factors of optical image information.

In FIG. 4, Motor HSYNC indicates a period signal for 1 Line to be scanned by the motor 130. Note that Motor HSYNC, CCD Shift gate pulses, and ON/OFF control pulses of the light sources shown in FIG. 4 are output in accordance with an instruction from the system controller 126.

The accumulation time (CCD Shift gate pulse period) of the CCD image sensor 115 is divided into, e.g., four periods in 1 Line, as shown in FIG. 4, and a signal component as image information obtained by an ON/OFF control pulse of LED1, and a signal component as image information obtained based on a relative ON time based on an ON/OFF control pulse of LED2 are alternately obtained in line sequence as CCD output signals in these periods. By averaging or adding CCD image sensor outputs corresponding to signal components of each LED, positional deviation of image information can be nearly removed. Also, since the relative ON time of each light source in 1 Line increases, the S/N can be improved.

By dividing the accumulation time (CCD Shift gate pulse period) of the CCD image sensor 115 into shorter periods in 1 Line, positional deviation factors can be further eliminated.

When a light source that can emit white light is used as LED1, and the CCD image sensor 115 outputs a plurality of color signals such as R, G, and B signals or the like, signals may be averaged or added for each color component, and image signals corresponding to the ON times of LED2 may also be averaged or added.

Upon reading an image, a high-quality image signal for dust/scratch removal can be read by a single scan by line-sequentially switching the respective light sources and averaging or adding signals while maintaining the above positional relationship all the time. Furthermore, S/N deterioration can be improved.

<Dust/Scratch Removal>

The read process of a high-quality image signal free from the influences of dust and scratches using the high-quality image signal acquired for dust/scratch removal will be explained below. Note that the process to be described below is executed by the signal processing circuit 120 in accordance with an instruction from the system controller 126.

Dust/scratch information of a film is reflected in image information obtained by irradiating the film with light emitted by infrared LED2. Cyan, yellow, and magenta of a general negative/positive color film have high transmittance in infrared light. Therefore, such positive/negative color film transmits nearly all light components coming from infrared LED2 independently of an image on the film. On the other hand, if dust or scratches are present on the film, they do not transmit light. Hence, if dust or scratches are present on the film, information that reflects such dust/scratch image can be acquired independently of an image on the film.

On the other hand, dust/scratch information of a film is reflected in image information obtained by irradiating the film with light emitted by LED1, and an image on the film is also reflected in that information.

By processing image information obtained by irradiating a film with light emitted by infrared LED2 and LED1, a high-quality image free from the influences of dust and scratches can be read.

In this embodiment, an image is read while fixing a document as an object. Alternatively, a scan may be made by moving an object.

Second Embodiment

FIG. 5 shows the second embodiment of the LED array 29 on which LED1 elements which correspond to an LED light source used to read image information, and infrared LED2 elements which correspond to a light source used to detect dust/scratch information are arranged on nearly 1 Line in the main scan direction.

The LED1 and LED2 elements are respectively arranged at pitches d3 and d4 and can independently undergo ON/OFF control. In FIG. 5, the present invention can be practiced without limiting the number of LED elements.

Note that the pitches d3 and d4 need not be fixed, and may be freely set based on design causes such as the light amount level, homogeneity in the main scan direction, and the like. Note that the LED1 elements can use a plurality of types of LEDs such as R, G, B, white, and the like.

With the layout shown in FIG. 5 as well, the light amount distribution L1$b$ formed by LED1, and the light amount distribution L2$b$ formed by LED2 can be made nearly equal, as shown in FIG. 3A, since the LED1 and LED2 elements are arranged on 1 Line, similarly to the arrangement shown in FIG. 2. Thus positional deviation factors of optical image information can be eliminated.

Third Embodiment

Figure 6:
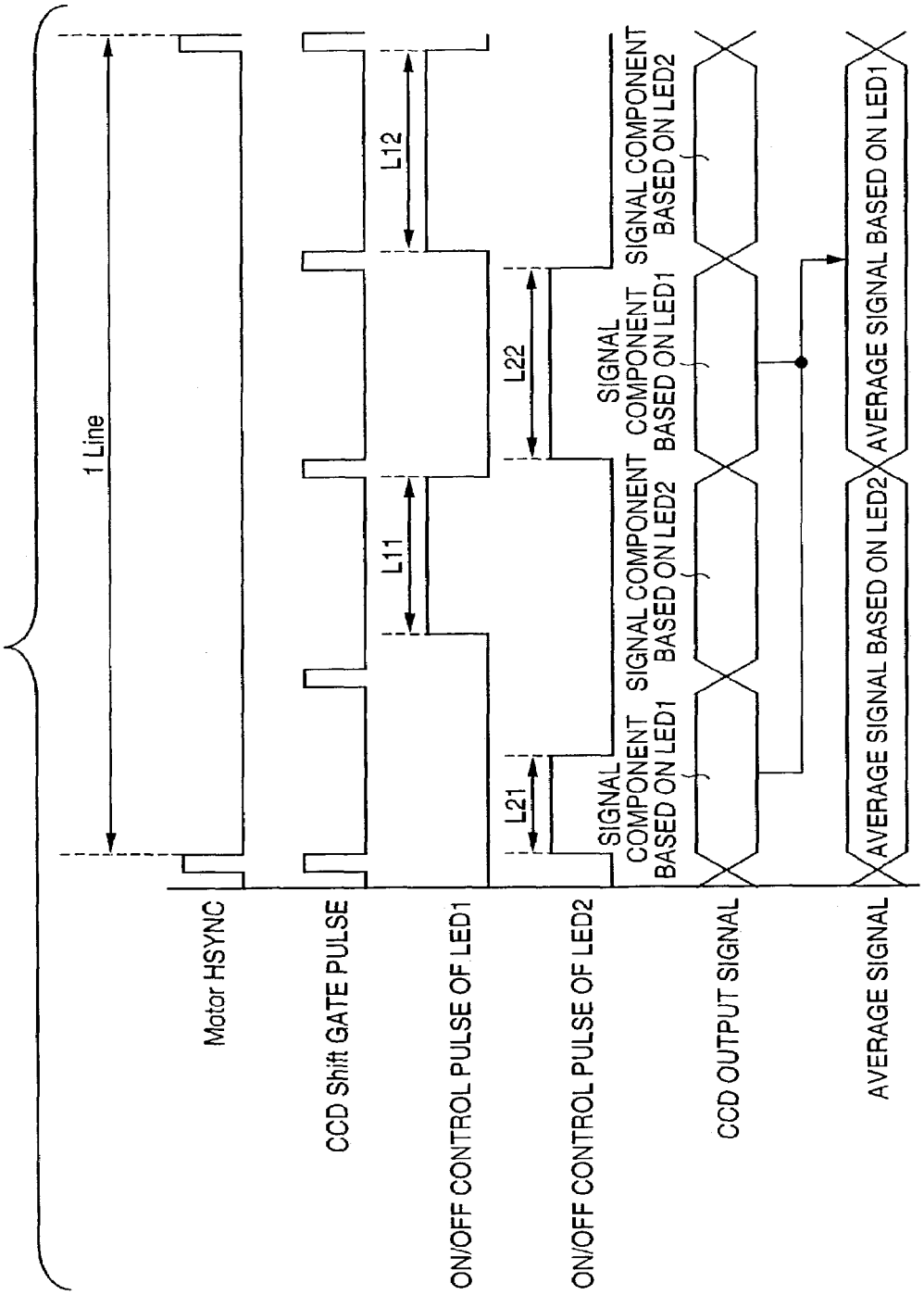
FIG. 6 is an operation timing chart for explaining a third embodiment of the present invention.

In FIG. 6, Motor HSYNC indicates a period signal for 1 Line to be scanned by the motor 130.

The accumulation time (CCD Shift gate pulse period) of the CCD image sensor 115 is divided into, e.g., four periods in 1 Line, as shown in FIG. 6, and a signal component as image information obtained by an ON/OFF control pulse of LED1, and a signal component as image information obtained based on a relative ON time based on an ON/OFF control pulse of LED2 are alternately obtained in line sequence as CCD output signals in these periods. By averaging or adding CCD image sensor outputs corresponding to signal components of each LED, positional deviation of image information can be mostly removed.

In FIG. 6, even when positional deviation is too large to ignore the difference between the light amount distributions of LED1 and LED2 shown in FIG. 2 or 5, or when the difference between the output levels of the LED elements is large, the ON time of LED1 can be controlled as L11 and L12, and that of LED2 can be controlled as L21 and L22 so as to allow fine adjustment. In addition, since the relative ON time of each light source in 1 Line increases compared to the conventional apparatus, the S/N can be improved.

By dividing the accumulation time (CCD Shift gate pulse period) of the CCD image sensor 115 into shorter periods in 1 Line, positional deviation factors can be further eliminated. Upon reading an image, a high-quality image signal from which effects of dust/scratch are removed can be obtained by a single scan by line-sequentially switching the respective light sources and averaging or adding signals while maintaining the above positional relationship all the time.

Fourth Embodiment

FIG. 7 shows an embodiment in which an output component based on LED2 is output twice in addition to output of a signal component based on LED1 upon reading an image for 1 Line. For example, as shown in FIG. 7, upon reading an image for 1 Line, a signal component based on LED2 is output first, a signal component based on LED1 is then output, and a signal component based on LED2 is output again and is averaged with or added to the signal component based on LED2 which was output at the beginning of reading of 1 Line. In this manner, positional deviation of image information can be nearly eliminated. Also, since the relative ON time of each light source in 1 Line increases, the S/N can be improved, as in the above embodiments.

As described above, according to the first to fourth embodiments, since a document reading light source and dust/scratch detection light source can form nearly equal light amount distributions, positional deviation factors of optical image information can be removed.

The accumulation time (CCD Shift gate pulse period) of the CCD image sensor 115 is divided into, e.g., a plurality of periods in 1 Line, and a signal component as image information obtained by an ON/OFF control pulse of LED1, and a signal component as image information obtained based on a relative ON time based on an ON/OFF control pulse of LED2 are line-sequentially obtained as CCD output signals in these periods. By averaging or adding CCD image sensor outputs corresponding to signal components of each LED, positional deviation of image information can be nearly removed. Also, since the relative ON time of each light source in 1 Line increases, the S/N can be improved.

Hence, an image reading apparatus which can assure higher image quality can be provided.

Fifth Embodiment

FIG. 8 shows an LED array according to the fifth embodiment of the present invention. On an LED array 29, LED1 elements which correspond to an LED light source used to read color image information, and infrared LED2 elements which correspond to a light source used to detect dust/scratch information are arranged parallel to each other to be spaced a distance D. Note that limitations associated with the distance D will be described in detail later. The LED1 and LED2 elements are respectively arranged at pitches d1 and d2 and can independently undergo ON/OFF control. Note that the pitches d1 and d2 need not be fixed, and may be freely set based on design causes such as the light amount level, homogeneity in the main scan direction, and the like. Note that the LED1 elements can use a plurality of types of LEDs such as R, G, B, white, and the like.

Figure 15:
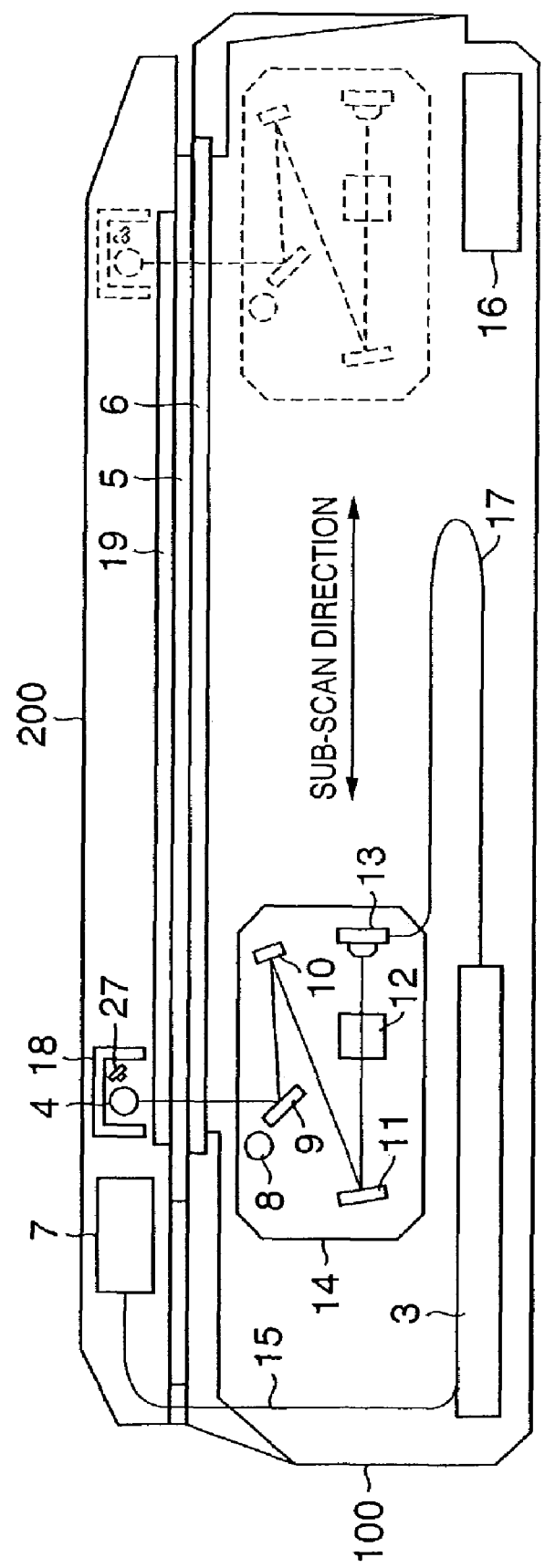
FIG. 15 is a schematic sectional view showing an example of a conventional image reading apparatus.
Figure 16:
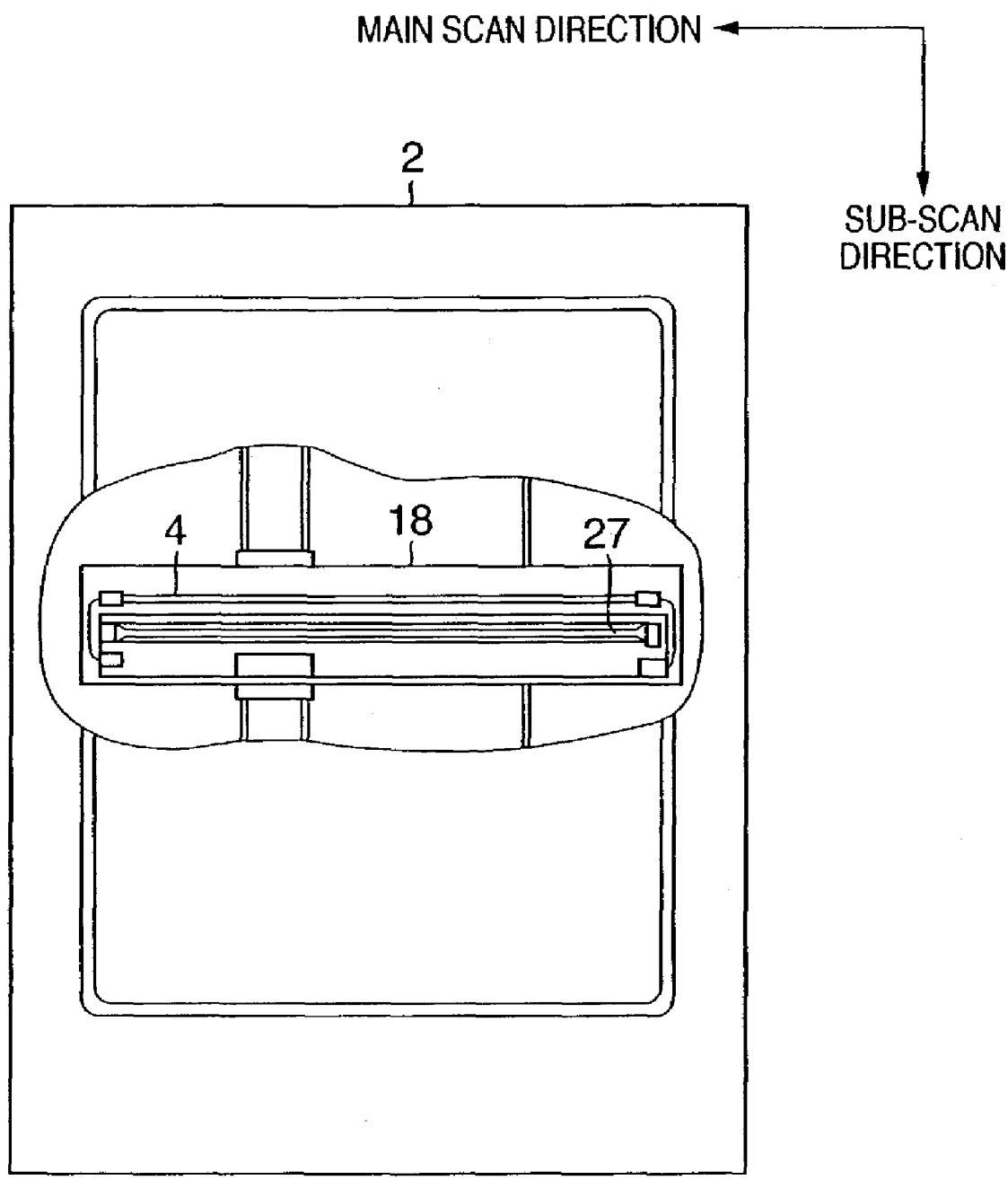
FIG. 16 is a partially cutaway front view showing an example of a transparent document illumination device used in the conventional image reading apparatus having a dust/scratch removal function.
Figure 17A:
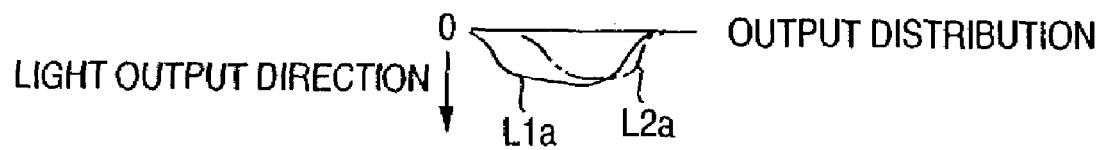
FIGS. 17A and 17B are views showing the optical positional relationship between a conventional transparent document illumination unit and optical unit, and the intensity levels of light.
Figure 17B:
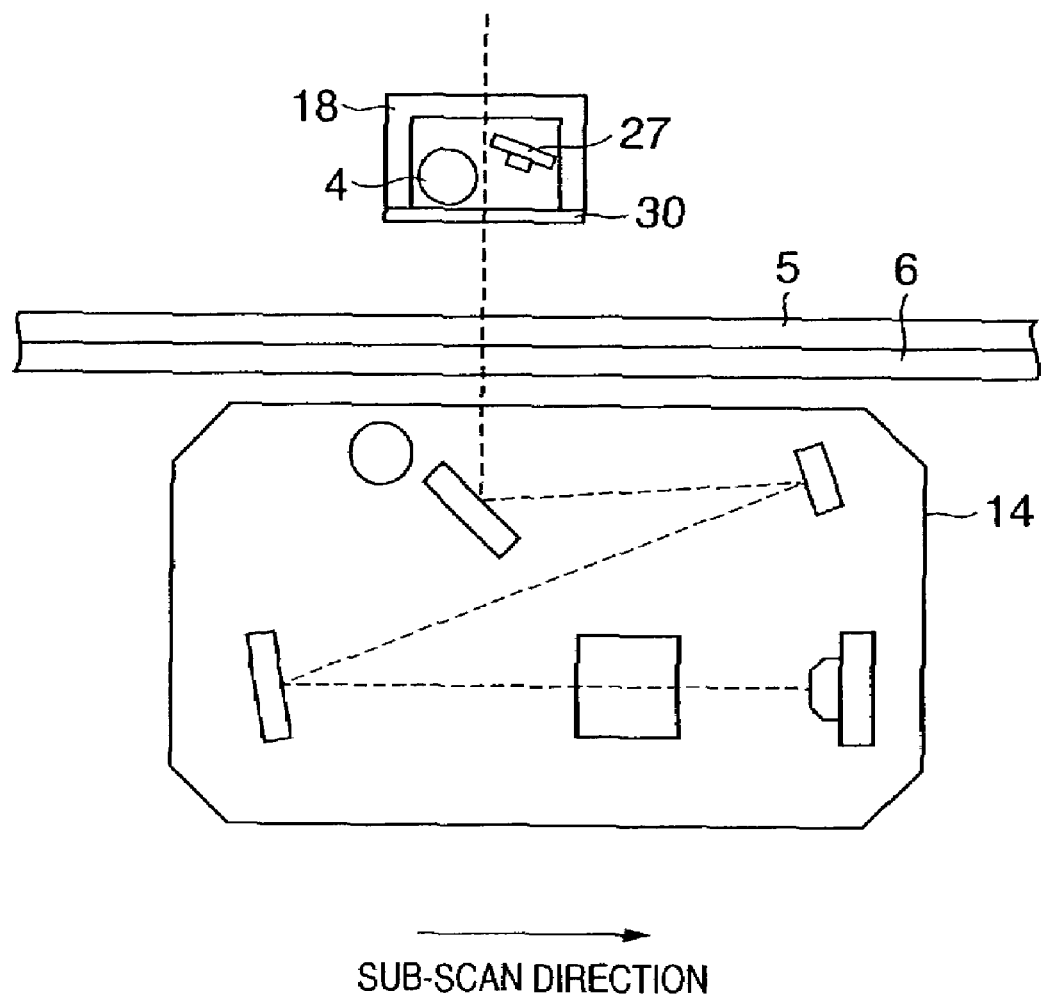

Using a transparent document illumination unit that uses the LED array 29 with the arrangement shown in FIG. 8 in place of the transparent document illumination unit 18 of the image input apparatus shown in FIG. 15, an image input apparatus can be provided at lower cost than the conventional apparatus while maintaining high performance of the dust/scratch removal function.

Since the schematic sectional view of an image input apparatus which adopts the LED array 29 according to the fifth embodiment is substantially the same as that shown in FIG. 15 except for the transparent document illumination unit 18, the same reference numerals denote the same parts as in FIG. 15.

Figure 9A:
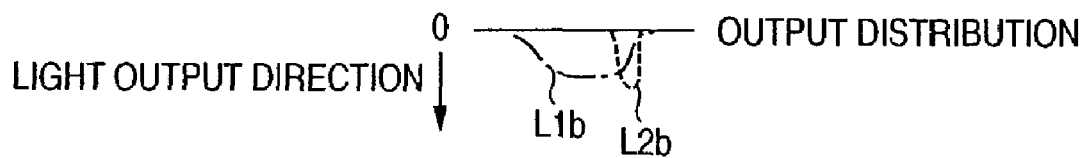
FIG. 9A is a graph showing the amounts of light of respective LEDs in the fifth embodiment of the present invention.
Figure 9B:
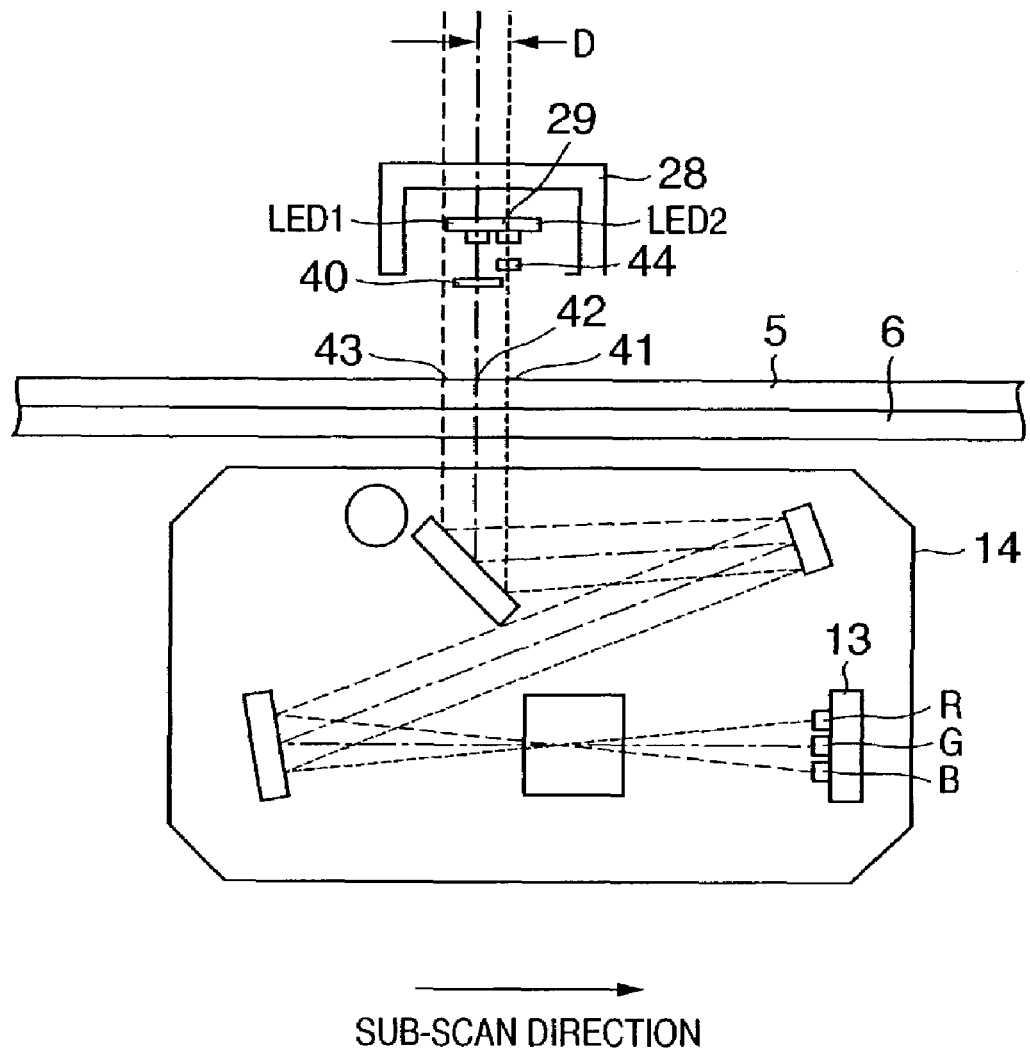
FIG. 9B is a schematic view showing the optical positional relationship between a transparent document illumination unit and optical unit.

In a transparent document illumination device 200, FIG. 9B shows the optical positional relationship for synchronously scanning a transparent document illumination unit 28 including the LED array 29 with the arrangement shown in FIG. 8, and an optical unit 14, and FIG. 9A is a graph showing the amounts of light of LED1 and infrared LED2. In FIG. 9A, the ordinate plots the amount of light, and the abscissa plots the position in the sub-scan direction in FIG. 9B.

The optical unit 14 reads an image while being scanned in the direction of an arrow (sub-scan direction) in FIG. 9B, as in the conventional apparatus. In order to read a film placed in the film guide 5, which is set at a predetermined position in advance, the optical unit 14 has a diffusion sheet 40 to make a light amount distribution L1b formed by LED1 of the transparent document illumination unit 28 more homogeneous within a predetermined range (the read position of the optical unit 14) in the sub-scan direction. That is, three, R, G, and B lines formed on a CCD image sensor 13 correspond to document positions 41, 42, and 43 on a document, and the unit 28 is designed so that a homogeneous light amount distribution is obtained within this range.

On the other hand, the diffusion sheet 40 is designed not to cover infrared LED2, and a light guide 44 which forms a homogeneous light amount distribution in the main scan direction is arranged. With this arrangement, infrared LED2 forms a considerably sharp light amount distribution L2b, whose peak has a very large light amount. In this manner, a sufficiently large light amount can be obtained using a fewer number of infrared LED2 elements.

Figure 10B:
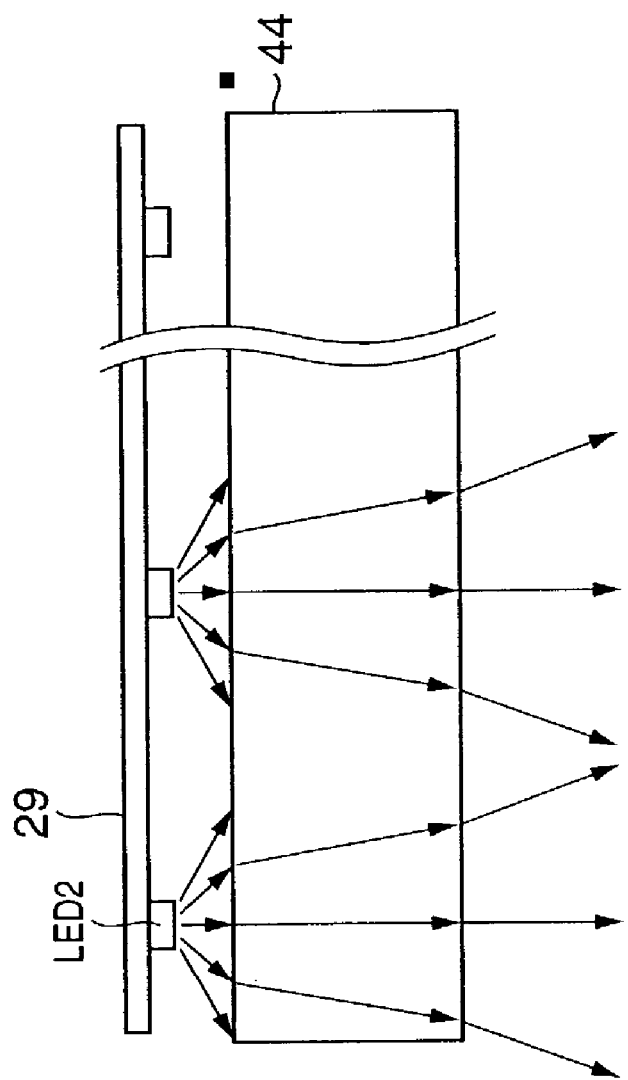
FIGS. 10A and 10B are schematic views showing an example of a light guide used in the fifth embodiment of the present invention.
Figure 10A:
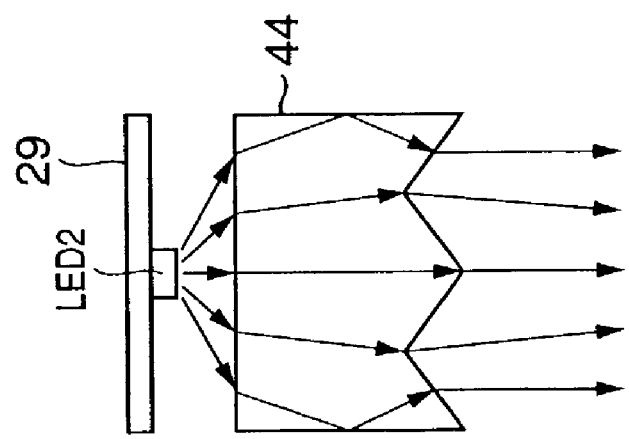

A rod-like transparent member which has a sectional shape shown in, e.g., FIG. 10A, can be used as the light guide 44. In this case, light components that come from infrared LED2 and become incident on the light guide 44 at various angles of incidence are refracted by an M-shaped surface portion, and go downward to be nearly parallel to each other. FIG. 10B is a side view of infrared LED2 and the light guide 44 (view along the sub-scan direction). Light components which are radiated radially can be converted into a homogeneous light amount distribution in the main scan direction, as shown in FIG. 10B.

As shown in FIGS. 9A and 9B, the peak position of the light amount distribution of infrared LED2 is separated the distance D shown in FIG. 8 from the center of the light amount distribution of LED1. This distance D is nearly equal to the distance between neighboring reading positions 41, 42, and 43 of three, R, G, and B lines of the CCD image sensor 13. Therefore, if the center of the light amount distribution of LED1 is set to agree with the reading position of the G line, the peak position of the light amount distribution of infrared LED2 on a transparent document agrees with the reading position of the R line. That is, when light that comes from infrared LED2 and is transmitted through a document, i.e., infrared light, forms an image on the R line of the CCD image sensor 13, dust/scratch information can be acquired from an electrical signal photoelectrically converted on the R line.

Figure 11:
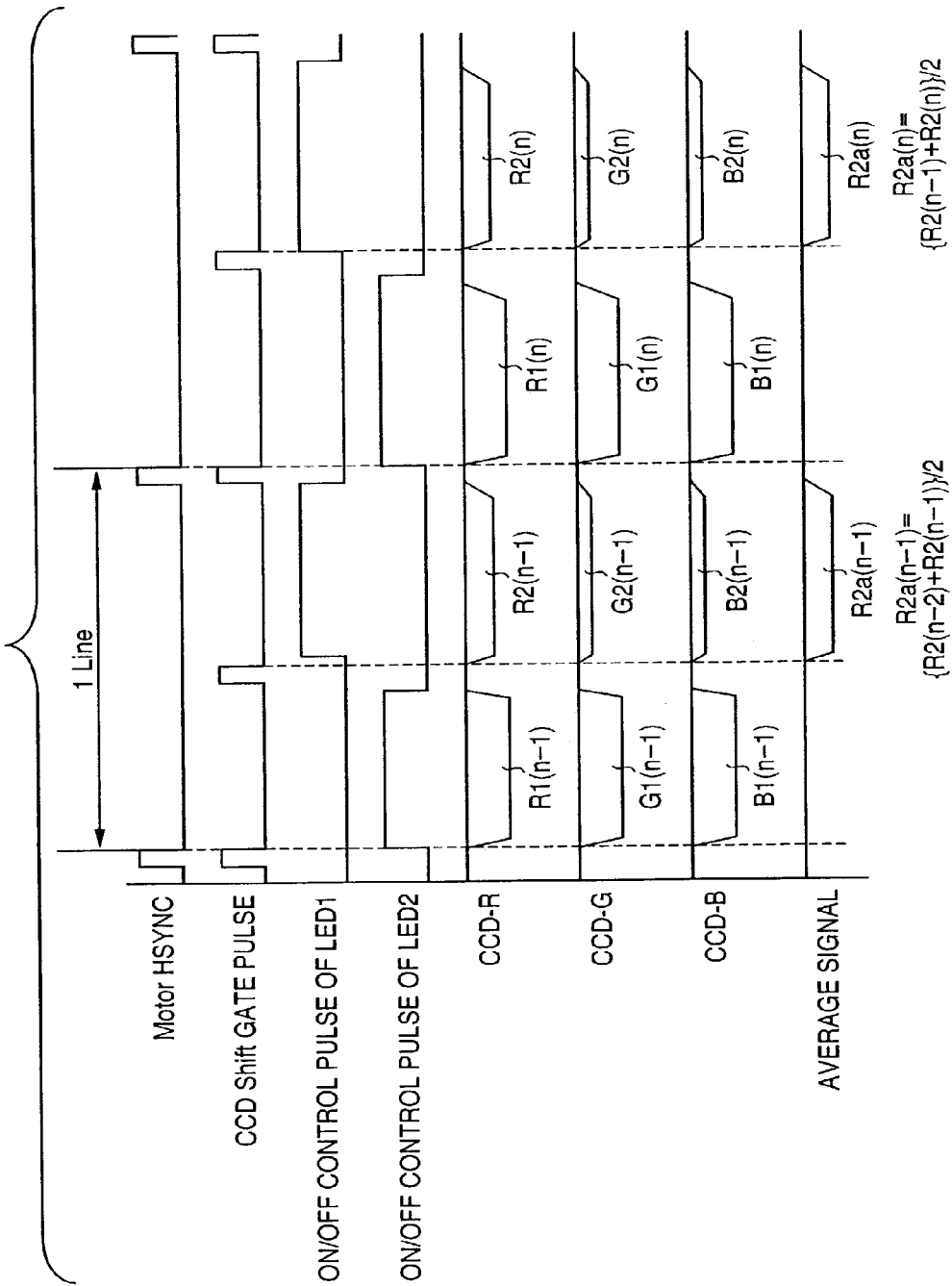
FIG. 11 is a timing chart showing the operation timings to explain the fifth and sixth embodiments of the present invention.

FIG. 11 is a timing chart showing the drive timings and output signals of the apparatus according to the fifth embodiment of the present invention.

Referring to FIG. 11, (a) indicates a period signal corresponding to the read time for one line to be scanned by the motor 16, and is called Motor HSYNC. The accumulation time (CCD Shift gate pulse period) of the CCD image sensor 13 is divided, as indicated by (b) of FIG. 11, in synchronism with the 1-line period. Also, (c) and (d) indicate ON/OFF control pulses of LED1 and LED2, and CCD output signals CCD-R, CCD-G, and CCD-B indicated by (e), (f), and (g) are obtained at their ON timings. Therefore, R, G, and B signal components R1(n), G1(n), and B1(n) for the n-th line, which are output from the CCD image sensor 13 at the ON timing of LED1, and R, G, and B signal components R2(n), G2(n), and B2(n) for the n-th line, which are output at the ON timing of LED2 are line-sequentially and alternately obtained.

As described above, since the peak of the light amount distribution of LED2 corresponds to the R line of the CCD image sensor 13, signal outputs obtained from G2(n) and B2(n) are very smaller than the signal component R2(n). Therefore, this fifth embodiment uses the signal component R2(n) alone.

The positions of images read as the signal components R1(n) and R2(n) are separated about the distance D from that of an image read as G1(n) in the sub-scan direction, and are separated substantially a distance 2D from that of an image read as B1(n). Hence, these images must be corrected.

Figure 12:
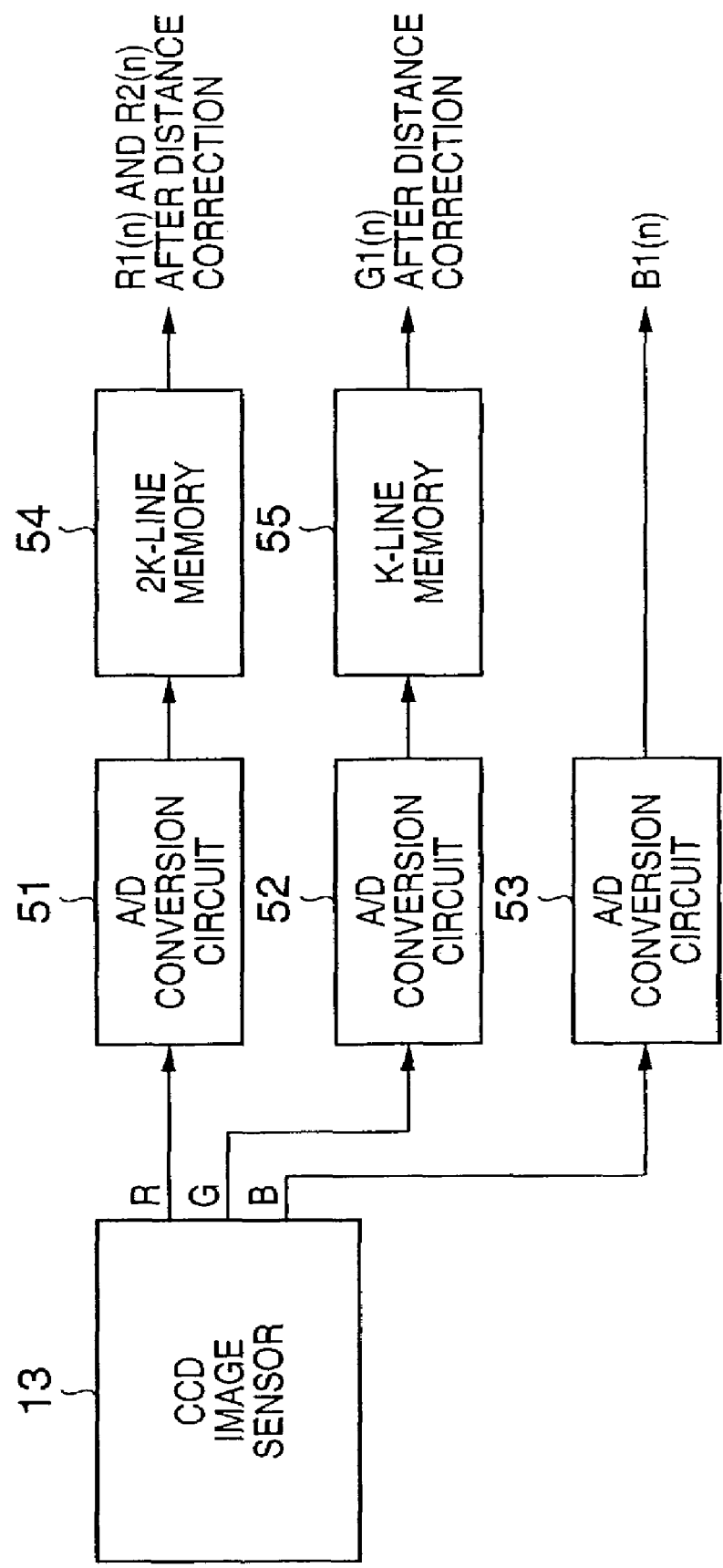
FIG. 12 is a block diagram showing the arrangement of a distance correction processing circuit in the fifth embodiment of the present invention.

FIG. 12 is a block diagram of such distance correction processing circuit. Reference numerals 51, 52, and 53 denote A/D conversion circuits; and 54 and 55, memories. As indicated by the scan direction of the optical unit in FIG. 9, the image read positions of R1(n) and R2(n) are located about the distance 2D ahead of that of B1(n). If the distance D is equal to the moving distance of the optical unit 14 for K lines in the sub-scan direction by the motor 16, the memory 54 can have a capacity for 2K lines. By storing the signal components R1(n) and R2(n) in the memory 54, and reading them out after a delay time for 2K lines, their read positions can approximately match that of the signal component B1(n). Likewise, in order to match the image read position of G1(n) with that of B1(n), the memory 55 suffices to have a capacity for K lines.

As described above, according to the fifth embodiment, by forming a sharp light distribution of the infrared LED light source used in dust/scratch detection with respect to the light source used to obtain R, G, and B images, and by matching the peak position of the light amount with the read position of the CCD, a high CCD output signal can be obtained without increasing the number of chips of the infrared LED.

Note that the distance correction processing circuit shown in FIG. 12 is mounted on the board 3 or an external processing apparatus such as a personal computer or the like (not shown), to which the readout signals are output.

Sixth Embodiment

The sixth embodiment of the present invention will be described below. Since the apparatus arrangement in the sixth embodiment is substantially the same as that of the fifth embodiment except for the arrangement of the distance correction processing circuit, a description thereof will be omitted.

Figure 13:
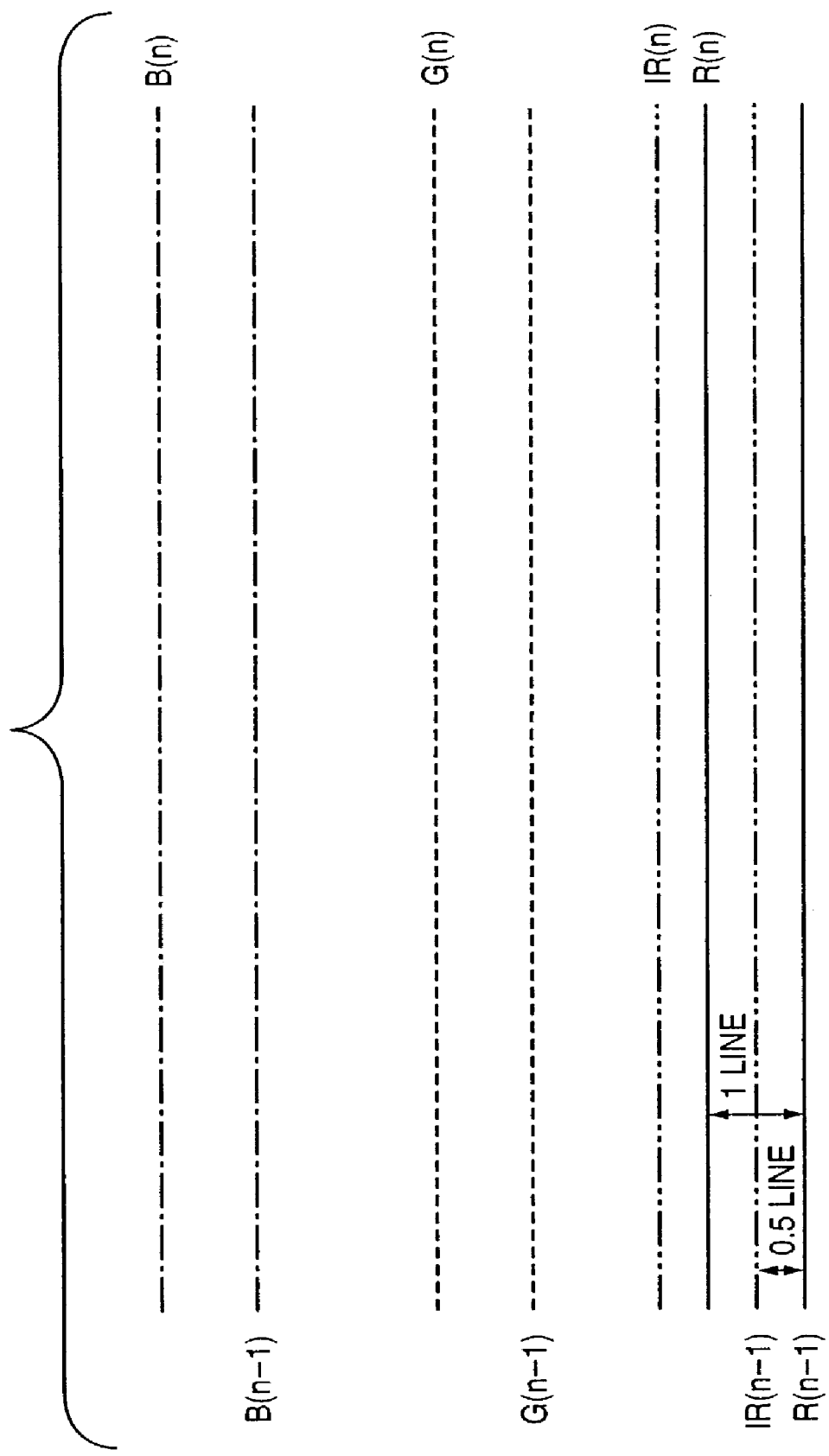
FIG. 13 is a view for explaining an image reading position in a sixth embodiment of the present invention.

The fifth embodiment has explained a case wherein the image positions of R1(n) and R2(n) match. However, when an image is read while moving the optical unit 14 at a constant speed in the sub-scan direction by the motor 16, since the ON/OFF control pulse of infrared LED2 delays 0.5 lines behind the ON/OFF control pulse of LED1, R2(n) is consequently deviated 0.5 lines from R1(n). FIG. 13 schematically shows the read positions of R, G, and B images for two lines, and those of an infrared light image for two lines. In order to correct such positional deviation, as indicated by (h) of FIG. 11, an average signal R2a(n) is calculated by:

$$R2a(n)=\{R2(n-1)+R2(n)\}/2$$

That is, the average signal of a signal R2(n-1) for the (n-1)-th line, and a signal R2(n) for the n-th line is calculated, and correction is made using this signal to match the image positions of R1(n) and R2(n). Using these signals R2a(n) and R1(n), dust and scratches on a transparent document are detected.

Figure 14:
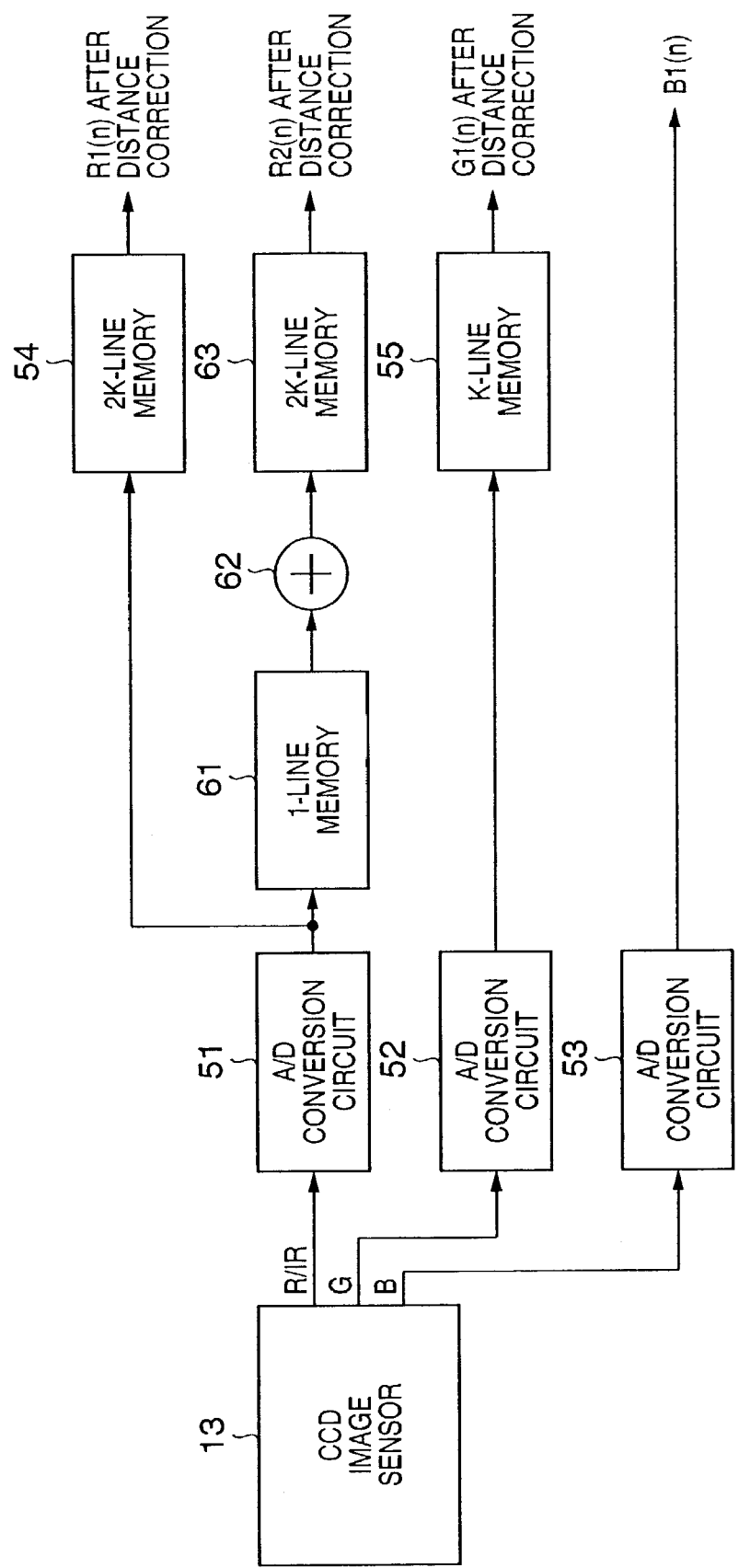
FIG. 14 is a block diagram showing the arrangement of a distance correction processing circuit in the sixth embodiment of the present invention.

FIG. 14 is a block diagram showing the arrangement of a distance correction processing circuit in the sixth embodiment. Reference numeral 61 denotes a memory for one line; 62, an average processing circuit; and 63, a memory having a capacity for 2K lines. Other arrangements are the same as those in FIG. 12.

As described above, according to the sixth embodiment, even when an image is read while moving the optical unit 14 at a constant speed, the same effect as in the fifth embodiment can be obtained.

It should be noted that in the above fifth and sixth embodiments, both of the diffusion sheet 40 and the light guide are provided; however, the present invention is not limited to this, and either one of them may be solely provided.

Dust/scratch removal in the second to sixth embodiments can be implemented by executing the same process as in the description of the first embodiment. Also, this process is executed by the signal processing circuit in accordance with an instruction from a controller such as the system controller 126 or the like.

In the description of the above embodiments, the transparent document illumination unit according to the present invention is used in a flatbed type image reading apparatus which can read both transparent and reflective documents. However, the present invention is not limited to such specific arrangement, and can be applied to, e.g., an image reading apparatus which moves the document position, an image reading apparatus such as a film scanner or the like, which can read a transparent document alone, and the like.

Other Embodiment

The present invention can be applied to a system constituted by a plurality of devices (e.g., host computer, interface, reader, printer) or to an apparatus comprising a single device (e.g., copying machine, facsimile machine).

Further, the light source drive control in the first to fourth embodiments of the present invention, and the deviation correction process of read signals in the fifth and sixth embodiments can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with the designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. A method of controlling an image reading apparatus, which comprises an illumination unit adapted to irradiate an object with first and second light rays, wherein said first and second light rays are one of white light and one of infrared light, and a light-receiving unit adapted to receive light coming from the object, and to output a signal, and reads an image of the object by moving the illumination unit and light-receiving unit relative to the object, comprising:

outputting from the light-receiving unit a first signal in response to irradiation with the first light ray, and a second signal in response to irradiation with the second light ray; and controlling to sequentially turn on the second light ray at a plurality of timings to sandwich an ON timing of the first light ray, and to obtain image signals for one line corresponding to the first and second light rays by averaging or adding respective pieces of image information obtained at the plurality of timings for each of the first and second signals, upon reading image information for one line by the image reading apparatus.

2. The method according to claim 1, wherein upon outputting the first and second signals, the light-receiving unit outputs a plurality of image signals in response to irradiation with each of the first and second light rays.

3. The method according to claim 1, wherein a position to be corrected is determined based on the averaged or added first and second signals.

4. The method according to claim 1, wherein the illumination unit includes portions that emit the first light ray, and portions that emit the second light ray, which are arranged on substantially one line.

5. A storage medium computer-readably storing a control program that makes a computer implement a control method of claim 1.

6. An image reading apparatus comprising:
 an illumination unit adapted to irradiate an object with first and second light rays, wherein said first and second light rays are one of white light and one of infrared light;
 a light-receiving unit adapted to receive light coming from the object, and to output a signal;
 a read controller adapted to read an image of the object by moving said illumination unit and said light-receiving unit relative to the object;
 a drive signal supply unit adapted to supply drive signals to said light-receiving unit to sequentially turn on the second light ray at a plurality of timings to sandwich an ON timing of the first light ray, and to output a first signal in response to irradiation with the first light ray, and a second signal in response to irradiation with the second light ray, upon reading image information for one line by said light-receiving unit; and
 a signal controller adapted to control to average or add a plurality of pieces of image information in one line obtained at the plurality of ON timings for each of the first and second signals.

7. The apparatus according to claim 6, wherein said light-receiving unit outputs a plurality of image signals in response to irradiation with each of the first and second light rays.

8. The apparatus according to claim 6, wherein said signal controller determines a position to be corrected on the basis of the averaged or added first and second signals.

9. The apparatus according to claim 6, wherein said illumination unit includes a portion that emits the first light ray, and a portion that emits the second light ray, which are arranged on substantially one line.

10. An illumination apparatus comprising
 a first light source unit adapted to emit white light;
 a second light source unit adapted to emit infrared light; and
 a diffusion sheet through which said white light and said infrared light passes,
 wherein said first and second light source units are arranged on substantially one line.

* * * * *